(12) United States Patent
Ishige et al.

(10) Patent No.: US 6,767,618 B2
(45) Date of Patent: Jul. 27, 2004

(54) MULTI-LAYERED STRETCHED RESIN FILM

(75) Inventors: Atsushi Ishige, Ibaraki (JP); Kazuhisa Kitamura, Ibaraki (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 10/061,224

(22) Filed: Feb. 4, 2002

(65) Prior Publication Data

US 2002/0160170 A1 Oct. 31, 2002

Related U.S. Application Data

(63) Continuation of application No. PCT/JP00/05212, filed on Aug. 3, 2000.

(30) Foreign Application Priority Data

Aug. 4, 1999 (JP) ............................................. 11-221127

(51) Int. Cl.[7] .............................. B32B 27/32; C08J 7/04
(52) U.S. Cl. .................. 428/220; 156/229; 156/244.24; 156/244.27; 264/171.23; 264/173.11; 264/173.14; 264/173.15; 264/173.16; 264/173.19; 264/210.6; 264/290.2; 428/319.7; 428/319.9; 428/327; 428/330; 428/334; 428/337; 428/516; 428/517; 428/521; 428/910
(58) Field of Search .......................... 156/229, 244.24, 156/244.27; 264/171.23, 173.11, 173.14, 173.15, 173.16, 173.19, 210.6, 290.2; 428/219, 220, 319.7, 319.9, 327, 330, 332, 334, 337, 516, 517, 521, 910

(56) References Cited

FOREIGN PATENT DOCUMENTS

| EP | 0 501 441 A | 9/1992 |
|---|---|---|
| EP | 0 666 183 | 6/1998 |
| EP | 0 845 490 A | 6/1998 |
| EP | 0 855 420 A | 7/1998 |
| EP | 1 174 262 | 1/2002 |
| JP | 08-281885 | 10/1996 |
| JP | 08 333466 | 12/1996 |
| JP | 2000-289156 | 10/2000 |

Primary Examiner—D. S. Nakarani
(74) Attorney, Agent, or Firm—Oblon, Spivak, McClelland, Maier & Neustadt, P.C.

(57) ABSTRACT

A multi-layered stretched resin film comprises a base layer (A) comprising more than 90 wt % of a polyolefinic resin and less than 10 wt % of an inorganic fine powder and/or an organic filler; and an amorphous resin-containing layer (B), comprising 0 to 85 wt % of a second polyolefinic resin, which may be the same or different than the first polyolefinic resin, and 15 to 100 wt % of an amorphous resin. The amorphous resin-containing layer (B) is disposed on at least one side of the base layer (A), and has a porosity of 5% or less. Such multi-layered stretched resin films are resistant to waving or curling caused by exposure to the vehicle component of offset printing inks during offset printing, and therefore have excellent printing properties.

21 Claims, 2 Drawing Sheets

MULTI-LAYERED STRETCHED RESIN FILM

BACKGROUND OF THE INVENTION

1. Field of the Invention

The present invention relates to a multi-layered stretched resin film which is resistant to becoming waved or curled due to contact with the vehicle of offset printing inks during offset printing, and thus has an excellent printing properties. The multi-layered stretched resin film of the present invention may be used as a material for tracing paper, maps, book covers, wrapping paper, book paper, sticker sheets, poster paper, menu sheets, hanging screens, labels, shopping bags, cardboard, brochures, illuminated sign board and so forth.

2. Description of the Background

Synthetic paper has been proposed and put into practical use in recent years to replace conventional natural pulp-made paper. The synthetic paper comprises a base layer made of a biaxially stretched polypropylene film containing 5 to 40 wt % of an inorganic fine powder, and paper-like layers disposed on the top and bottom surfaces thereof, made of a uniaxially stretched polypropylene film containing 8 to 65 wt % of an inorganic fine powder (e.g., as described in U.S. Pat. No. 4,318,950, Japanese Examined Patent Publication Nos. 46-40794, 60-36173 and 62-35412).

Offset printing, (i.e., lithography), is generally used for printing on paper, polyethylene terephthalate film, polyamide film, coated paper and the like, since this technique can readily provide multi-color printing. The typical composition of a general-purpose, dry-type offset printing ink is shown in FIG. 1 and Table 1 below.

TABLE 1

Composition of Offset Printing Ink (weight part)

|  | Ink for sheet printing | Ink for non-paper printing | Ink for rotary offset press |
|---|---|---|---|
| Pigment | 25 | 25 | 25 |
| Resin | 25 | 30 | 25 |
| Drying oil | 20 | 34 | 10 |
| High-boiling-point, petroleum-base solvent | 25 | 5 | 36 |
| Drier | 1 | 2 | — |
| Others | 4 | 4 | 4 |
| Total | 100 | 100 | 100 |

The vehicle shown in FIG. 1 refers to a liquid component, among the various components of which the printing ink is composed, which has the function of dispersing the pigment, thereby maintaining the fluidity of the ink; ensuring the smooth flow of the ink from the ink pot to a printing surface while the ink is transferred among individual rollers, the printing plate and printing blanket; and for fixing the pigment onto the printing surface by solidification of the vehicle after printing. In response to the recent strong requirement that the offset printing ink have a shortened drying time to allow more rapid printing, there is an increasing trend toward the used of quick-drying inks which are compounded with a vehicle which is mainly comprised of a drying oil mixed with resin and mineral oil (high-boiling-point, petroleum-base solvent).

However, synthetic paper comprising a stretched polyolefinic film or such film compounded with an inorganic fine powder is printed with such quick-drying offset printing inks, vehicle of the quick-drying offset printing ink swells the polyolefin of the synthetic paper, thereby producing local surface waving or curling of the printed film. This is a significant practical obstacle in using such synthetic papers. Conventional offset printing inks for polyolefinic film are therefore specially formulated to be free from mineral oil. However, this approach sacrifices the quick-drying property. In addition, such special offset printing inks for polyolefinic films require long drying times, and are used mainly in small specialty printing shops and manufacturers. There has therefore been a strong need for a new polyolefinic film on which the general-purpose offset printing ink of the oxidation polymerization type (drying oil type) may be used.

In other words, in the typical printing shop, offset printing is practiced on pulp-based paper such as wood free paper and coated paper using generally-commercialized, quick-drying ink. Printing on polyolefinic film or synthetic paper in such printing shops requires the temporary replacement of such ink with the special offset printing ink which is suitable for such non-absorbent material. However, replacement of the conventional ink for pulp-based paper is time- and labor-consuming. As a consequence, conventional print shops have resisted printing on polyolefinic film or synthetic paper, which has been one factor preventing the general use of polyolefinic film or synthetic paper in offset printing.

One approach to solving this problem has been suggested in Laid-Open Japanese Patent Publication No. 8-333466, in which a polyolefinic resin mixed with an amorphous resin is used as a part of the multi-layered film. However, this approach is still not completely successful in solving the problem of the swelling of the film (referred to as "solvent attack" hereinafter) due to the vehicle (in particular high-boiling-point, petroleum-based solvents such as mineral oil) in the offset printing ink.

It is therefore an object of the present invention to provide a multi-layered stretched resin film having excellent printing properties, which is less prone to surface waving or curling entirely, even if the film is printed with general-purpose, quick-drying offset printing ink.

SUMMARY OF THE INVENTION

The present inventors have found that adding an amorphous resin in a proper ratio to the surface layer of a thermoplastic resin film, and stretching this layer so as to substantially prevent voids from being formed, can successfully provide a multi-layered stretched resin film having excellent printing properties.

The present invention is a multi-layered stretched resin film which comprises a base layer (A) containing more than 90 wt % of a polyolefinic resin, and less than 10 wt % of an inorganic fine powder or an organic filler; and an amorphous resin-containing layer (B) provided on at least one side of the base layer (A), which contains 0 to 85 wt % of a polyolefinic resin and 15 to 100 wt % of an amorphous resin. In addition, the amorphous resin-containing layer (B) has a porosity of 5% or less. A particularly preferred multi-layered stretched resin film according to the present invention further comprises a surface layer (C) containing 30 to 85 wt % of a polyolefinic resin and 15 to 70 wt % of an inorganic fine powder or an organic filler. (In this specification, any numerical range indicated by values placed before and after the word "to" defines a range inclusive of the minimum and maximum values.)

BRIEF DESCRIPTION OF DRAWINGS

The above objects and features of the invention are apparent to those skilled in the art from the following

DETAILED DESCRIPTION OF THE PREFERRED EMBODIMENTS

Figure 1:
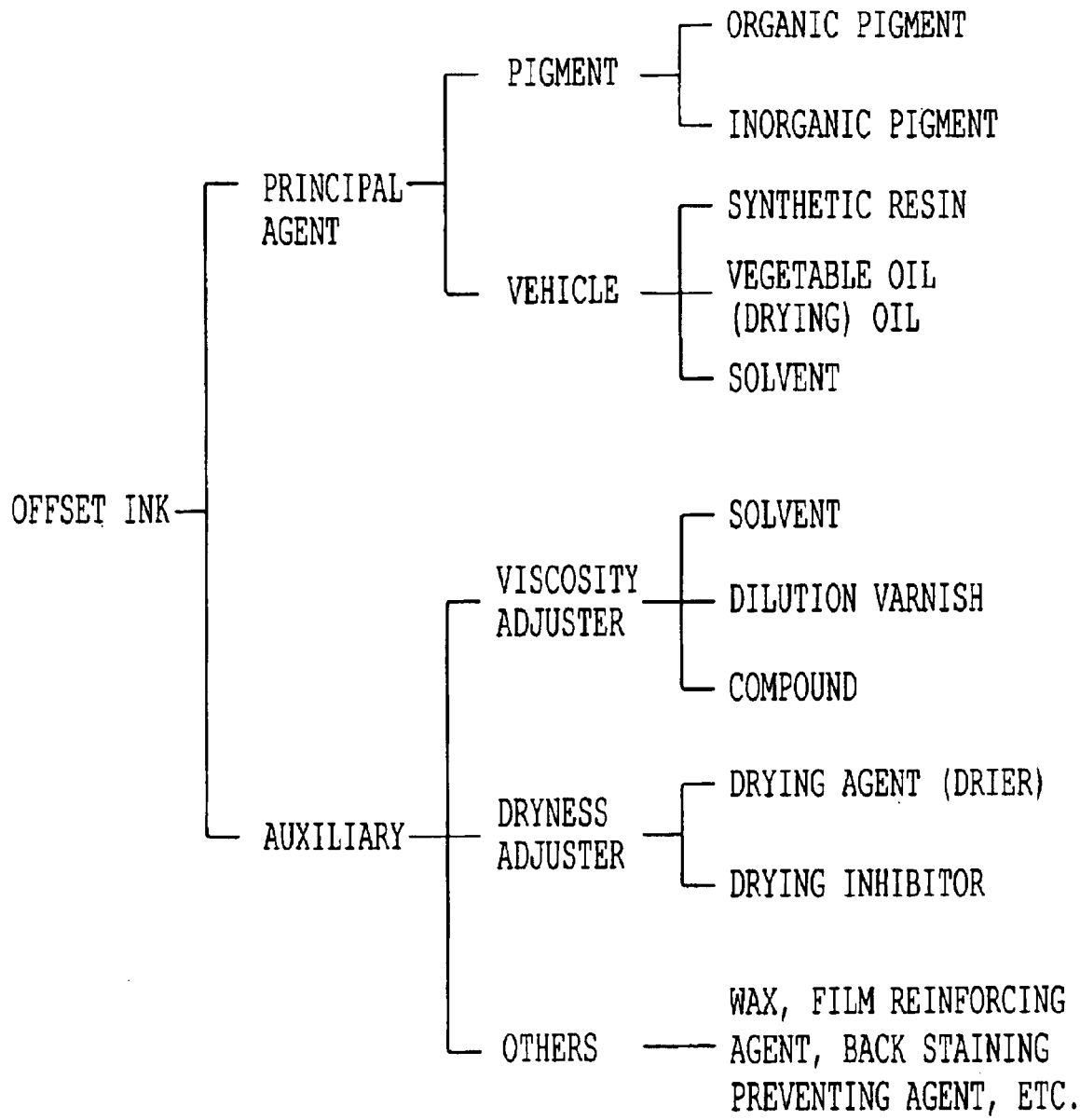
FIG. 1 is a chart showing the basic composition of an offset printing ink.

In a first embodiment, the multi-layered stretched resin film of the present invention comprises a base layer (A) and an amorphous resin-containing layer (B) provided on at least one side thereof.

In a second embodiment, the multi-layered stretched resin film of the present invention further comprises a surface layer (C) on at least one side of the multi-layered stretched resin film.

In a third embodiment, the multi-layered stretched resin film of the present invention can further comprise an optional intermediate layer (D) between the base layer (A) and amorphous resin-containing layer (B) or between the base layer (A) and surface layer (C).

Base Layer (A)

The base layer (A) of the multi-layered stretched resin film of the present invention comprises more than 90 wt % of a polyolefinic resin, and less than 10 wt % of an inorganic fine powder or an organic filler. There is no special limitation on the type of polyolefinic resin which may used in the base layer (A).

Examples of such polyolefinic resins include a homopolymer of $C_{2-8}$ α-olefins such as ethylene, propylene, 1-butene, 1-hexene, 1-heptene, 1-octene, 4-methyl-1-pentene and 3-methyl-1-pentene; and copolymers of 2 to 5 of such u-olefins. The polyolefinic resin may be in the form of either a random copolymer or block copolymer. More specifically, the polyolefinic resin may be a branched or normal polyethylene having a density of 0.89 to 0.97 $g/cm^3$ and a melt flow rate (190° C, 2.16 kg load) of 1 to 10 g/10 minutes; and polymers having a melt flow rate (230° C, 2.16 kg load) of 0.2 to 20 g/10 minutes such as a propylene homopolymer, a (4-methyl-1-pentene) homopolymer, a propylene-ethylene copolymer, a propylene-(1-butene) copolymer, a propylene-ethylene-(1-butene) copolymer, a propylene-(4-methyl-1-pentene) copolymer, a propylene-(3-methyl-1-pentene) copolymer, poly(1-butene), poly(4-methyl-1-pentene) and propylene-ethylene-(3-methyl-1-pentene) copolymer. Propylene homopolymer, propylene-ethylene random copolymer and high-density polyethylene are preferred because they are inexpensive and easily processed.

The polyolefinic resin used for the base layer (A) preferably has a melting point (i.e., peak temperature in a DSC curve) of 130 to 210° C. In particular, propylene homopolymer having a melting point (peak temperature in a DSC curve) of 155 to 174° C., a melt flow rate (JIS K-7210, herein incorporated by reference) of 0.5 to 10 g/10 minutes and a crystallinity of 45 to 70% is preferable. The base layer (A) may be comprised of a single type of polyolefinic resin, or may be a mixture of two or more polyolefinic resins, selected from the polyolefinic resins described above.

The inorganic fine powder of the base layer (A) preferably has an average grain size of 0.01 to 10 μm, and more preferably 0.05 to 8 μm. The organic filler used for the base layer (A) preferably has an average dispersion grain size of 0.01 to 10 μm, and more preferably 0.05 to 8 μm.

The inorganic fine powder may include, for example, heavy calcium carbonate, precipitated calcium carbonate, fired clay, talc, titanium oxide, barium sulfate, aluminum sulfate, silica, zinc oxide, magnesium oxide and diatom earth. Surface modified products of such inorganic fine powder are also available. Heavy calcium carbonate, precipitated calcium carbonate, surface modified products of such calcium carbonates, clay, and diatom earth are the preferred inorganic fine powders because they are inexpensive and have suitable void forming properties during stretching.

The organic filler may be exemplified by polyethylene terephthalate, polybutylene terephthalate, polyamide, polycarbonate, polyethylene naphthalate, polystyrene, melamine resin, cyclopolyolefin, polyethylene sulfite, polyimide, polyethyl ether ketone and polyphenylene sulfite. Preferred organic fillers are incompatible inorganic fillers having a higher melting point or glass transition temperature than that of the polyolefinic resin with which they are combined. Such organic fillers provide good void formation properties.

A single type of inorganic fine powder or organic filler may be selected from those described above, or two or more such inorganic fine powders or organic fillers may be combined. For example, two or more inorganic fine powders may be combined, two or more organic fillers may be combined, or one or more inorganic fine powders may be combined with one or more organic fillers.

The base layer (A) may comprise less than 10 wt % of the inorganic fine powder and/or organic filler and more than 90 wt % of the polyolefinic resin. Preferably, the base layer (A) comprises 92 to 99.5 wt % of the polyolefinic resin, and 0.5 to 8 wt % of the inorganic fine powder and/or organic filler. More preferably, the base layer (A) comprises 94 to 99 wt % of the polyolefinic resin, and 1 to 6 wt % of the inorganic fine powder and/or organic filler.

The base layer (A) may have voids, and preferably has a porosity of 0 to 9%. (The porosity of the base layer (A) is defined as the ratio of the cross-sectional area of the voids relative to the total cross-sectional area of the base layer (A), as determined by measurement of the cross-section of a multi-layered stretched resin film under a scanning electron microscope.) The voids may be produced by stretching the film, either by uniaxial stretching or biaxial stretching processes. The thickness of the base layer (A) is preferably 20 to 250 μm, more preferably 30 to 200 μm.

Amorphous Resin-Containing Layer (B)

The amorphous resin-containing layer (B) of the multi-layered stretched resin film of the present invention comprises 0 to 85 wt % of a polyolefinic resin and 15 to 100 wt % of an amorphous resin. The types of polyolefinic resins in the amorphous resin-containing layer (B) are not particularly limited, and may include those described above for the base layer (A). In particular, propylene homopolymer, high-density polyethylene and mixtures thereof are preferred. Propylene homopolymers having a melting point (peak temperature in a DSC curve) of 155 to 174° C., a melt flow rate (JIS K-7210) of 0.5 to 20 g/10 minutes and a crystallinity of 45 to 70%, and high-density polyethylene having a melting point (peak temperature in a DSC curve) of 120 to 135° C., a melt flow rate (JIS K-6760, herein incorporated by reference) of 0.2 to 20 g/10 minutes, a crystallinity of 65 to 95%, and a density of 0.945 $g/cm^3$ or above are more preferred. The polyolefinic resin of the amorphous resin-containing layer (B) may be a single type of polyolefinic resin, for example selected from those listed above, or may be a combination of two or more such resins. The polyolefinic resin of the amorphous resin-containing layer (B) may be the same or different from the polyolefinic resin of the base layer (A).

The amorphous resin of the amorphous resin-containing layer (B) preferably has a glass transition temperature of 170° C. or below, and more preferably 70 to 170° C. If the glass transition temperature of the amorphous resin containing layer (B) is lower than 70° C., the resulting film tends to adhere to itself when rolled up, and thus is difficult to form into films. If the glass transition temperature of the amorphous resin-containing layer (B) is higher than 170° C., the film tends to form an excessive amount of voids during stretching, thereby increasing the porosity of the film. This tends to reduce the ability of the film to resist solvent attack upon printing.

During the process of preparing the multi-layered stretched resin film of the present invention, the stretching temperature is preferably set at a temperature higher which is 10° C. or more higher than the glass transition temperature of the amorphous resin.

The amorphous resin of the amorphous resin-containing layer (B) may be, for example, a cycloolefinic resin, an atactic polystyrene, a petroleum resin, a polycarbonate or an acrylic resin. The amorphous resin-containing layer (B) may include a single type of amorphous resin, or a combination of two or more such amorphous resins.

A cycloolefinic resin is a particularly preferred amorphous resin. The cycloolefinic resin may be, for example, a resin selected from the group consisting of ring-opened polymers derived from a cycloolefinic monomer having the formula (1) below; hydrogenated ring-opened polymers or copolymers of cycloolefinic monomers having the formula (1) below; and copolymers of ethylene and a cycloolefinic monomer having the formula (1):

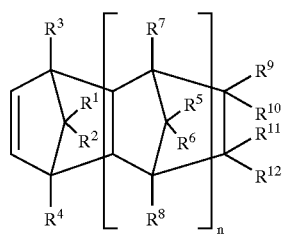

(1)

where, "n" denotes 0 or a positive integer, $R^1$ to $R^{12}$ independently represents an atom or a functional group selected from the group consisting of a hydrogen atom, a halogen atom and hydrocarbon groups, $R^5$ to $R^{12}$ may be bound with each other to form a monocyclic or polycyclic group, where such monocyclic or polycyclic groups may have a double bond, and $R^9$ and $R^{10}$, or $R^{11}$ and $R^{12}$ together may form an alkylidene group.

Such cycloolefinic monomers may include known monomers disclosed, for example, in Japanese Laid-Open Patent Publication Nos. 2-227424, 2-276842, 5-97719, 7-41550 and 8-72210, herein incorporated by reference. Specific examples of such cycloolefinic monomers include bicyclo[2.2.1]hepto-2-ene derivatives, tetracyclo[4.4.0.1$^{2,5}$.1$^{7,10}$]-3-dodecene derivatives,
hexacyclo[6.6.1.1$^{3,6}$1$^{10,13}$.0$^{2,7}$.0$^{9,14}$]-4-heptadecene derivatives,
octacyclo[8.8.0.1$^{2,9}$.1$^{4,7}$.1$^{11,18}$.1$^{13,16}$.0$^{3,8}$.0$^{12,17}$]-5-docosene derivatives,
pentacyclo[6.6.1.1$^{3,6}$.0$^{2,7}$.0$^{9,14}$]-4-hexadecene derivatives,
heptacyclo-5-eicosene derivative, heptacyclo-5-heneicosene derivatives,
tricyclo[4.3.0.1$^{2,5}$]-3-decene derivatives,
tricyclo[4.4.0.1$^{2,5}$]-3-undecene derivaives,
pentacyclo[6.5.1.1$^{3,6}$.0$^{2,7}$.0$^{9,13}$]-4-pentadecene derivatives,
pentacyclopentadecadiene derivatives,
pentacyclo[7.4.0.1$^{2,4}$.1$^{9,12}$.0$^{8,13}$]-3-pentadecene derivatives,
heptacyclo[8.7.0.1$^{3,6}$.1$^{10,18}$.1$^{12,15}$.0$^{2,7}$.0$^{11,16}$]-4-eicosene derivatives,
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives,
pentacyclo[8.4.0.1$^{2,5}$.1$^{9,12}$.0$^{8,13}$]-3-hexadecene derivatives,
heptacyclo[8.8.0.1$^{4,7}$.1$^{11,18}$.1$^{3,16}$.0$^{3,8}$.0$^{12,17}$]-5-heneicosene derivatives,
nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives,
1,4-methano-1,4,4a,9a-teterahydrofluorene derivatives,
1,4-methano-1,4,4a,5,10,10a-hexahydroanthracene derivatives, and cyclopentadiene-acenaphthylene adduct.

More specifically, examples of such monomers may include:

bicyclo[2.2.1]hepto-2-ene derivatives such as
bicyclo[2.2.1]hepto-2-ene,
6-methylbicyclo[2.2.1]hepto-2-ene, 5,6-dimethylbicyclo [2.2.1]hepto-2-ene,
1-methylbicyclo[2.2.1]hepto-2-ene, 6-ethylbicyclo[2.2.1] hepto-2-ene,
6-n-butylbicyclo[2.2.1]hepto-2-ene, 6-isobutylbicyclo [2.2.1]hepto-2-ene and
7-methylbicyclo[2.2.1]hepto-2-ene;
tetracyclo[4.4.0.1$^{2,5}$.1$^{7,10}$]-3-dodecene derivatives such as tetracyclo[4.4.0.1$^{2,5}$.1$^{7,10}$]-3-dodecene,
8-methyltetracyclo [4.4.0.1$^{2,5}$.1$^{7,10}$]-3-dodecene,
8-ethyltetracyclo[4.4.0.1$^{2,5}$.1$^{7,10}$]-3-dodecene,
8-propyltetracyclo[4.4.0.1$^{2,5}$.1$^{7,10}$]-3-dodecene,
8-butyltetracyclo[4.4.0.1$^{2,5}$.1$^{7,10}$]-3-dodecene,
8-isobutyltetracyclo[4.4.0.1$^{2,5}$.1$^{7,10}$]-3-dodecene,
8-hexyltetracyclo[4.4.0.1$^{2,5}$.1$^{7,10}$]-3-dodecene,
8-cyclohexyltetracyclo[4.4.0.1$^{2,5}$.1$^{7,10}$]-3-dodecene,
8-stearyltetracyclo[4.4.0.1$^{2,5}$.1$^{7,10}$]-3-dodecene,
5,10-dimethyltetracyclo[4.4.0.1$^{2,5}$.1$^{7,10}$]-3-dodecene,
2,10-dimethyltetracyclo[4.4.0.1$^{2,5}$.1$^{7,10}$]-3-dodecene,
8,9-dimethyltetracyclo[4.4.0.1$^{2,5}$.1$^{7,10}$]-3-dodecene,
8-ethyl-9-methyltetracyclo[4.4.0.1$^{2,5}$.1$^{7,10}$]-3-dodecene,
11,12-dimethyltetracyclo[4.4.0.1$^{2,5}$.1$^{7,10}$]-3-dodecene,
2,7,9-trimethyltetracyclo[4.4.0.1$^{2,5}$.1$^{7,10}$]-3-dodecene,
9-ethyl-2,7-dimethyltetracyclo[4.4.0.1$^{2,5}$.1$^{7,10}$]-3-dodecene,
9-isobutyl-2,7-dimethyltetracyclo [4.4.0.1$^{2,5}$.1$^{7,10}$]-3-dodecene,
9,11,12-trimethyltetracyclo[4.4.0.1$^{2,5}$.1$^{7,10}$]-3-dodecene,
9-ethyl-11,12-dimethyltetracyclo[4.4.0.1$^{2,5}$.1$^{7,10}$]-3-dodecene,
9-isobutyl-11,12-dimethyltetracyclo [4.4.0.1$^{2,5}$.1$^{7,10}$]-3 dodecene,
5,8,9,10-tetramethyltetracyclo[4.4.0.1$^{2,5}$.1$^{7,10}$]-3-dodecene,
8-ethylidene-9-methyltetracyclo[4.4.0.1$^{2,5}$.1$^{7,10}$]-3-dodecene,
8-ethylidene-9-ethyltetracyclo[4.4.0.1$^{2,5}$.1$^{7,10}$]-3-dodecene,
8-ethylidene-9-isopropyltetracyclo[4.4.0.1$^{2,5}$.1$^{7,10}$]-3-dodecene,
8-ethylidene-9-butyltetracyclo[4.4.0.1$^{2,5}$.1$^{7,10}$]-3-dodecene,
8-n-propylidenetetracyclo[ 4.4.0.1$^{2,5}$.1$^{7,10}$]-3-dodecene,
8-n-propylidene-9-methyltetracyclo[4.4.0.1$^{2,5}$.1$^{7,10}$]-3-dodecene,
8-n-propylidene-9-ethyltetracyclo[4.4.0.1$^{2,5}$.1$^{7,10}$]-3-dodecene,
8-n-propylidene-9-isopropyltetracyclo[4.4.0.1$^{2,5}$.1$^{7,10}$]-3-dodecene, 8-n-propylidene-9-butyltetracyclo[4.4.0.1$^{2,5}$.1$^{7,10}$]-3-dodecene,
8-isopropylidenetetracyclo[4.4.0.1$^{2,5}$.0$^{7,17}$]-3-dodecene,
8-isopropylidene-9-methyltetracyclo[4.4.0.1$^{2,5}$.1$^{7,10}$]-3-dodecene,
8-isopropylidene-9-ethyltetracyclo[4.4.0.1$^{2,5}$.1$^{7,10}$]-3-dodecene,
8-isopropylidene-9-isopropyltetracyclo[4.4.0.1$^{2,5}$.1$^{7,10}$]-3-dodecene,
8-isopropylidene-9-butyltetracyclo[4.4.0.1$^{2,5}$.1$^{2,5}$.1$^{7,10}$]-3-dodecene,
8-chlorotetracyclo[4.4.0.1$^{2,5}$.1$^{7,10}$]-3-dodecene,
8-bromotetracyclo[4.4.0.1$^{2,5}$.1$^{7,10}$]-3-dodecene,
8-fluorotetracyclo[4.4.0.1$^{2,5}$.1$^{7,10}$]-3-dodecene, and
8,9-dichlorotetracyclo[4.4.0.1$^{2,5}$.1$^{7,10}$]-3-dodecene;
hexacyclo[6.6.1.1$^{3,6}$.1$^{10,13}$.0$^{2,7}$.0$^{9,14}$]-4-heptadecene derivatives such as
hexacyclo[6.6.1$^{3,6}$.1$^{10,13}$.0$^{2,7}$.0$^{9,14}$]-4-heptadecene,
12-methylhexacyclo[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene, and
1,6,10-trimethyl-12-isobutylhexacyclo[6.6.1.1$^{3,6}$.1$^{10,13}$.0$^{2,7}$.0$^{9,14}$]-4-hepta-decene;
octacyclo[8.8.0.1$^{2,9}$.1$^{4,7}$.1$^{11,18}$.1$^{13,16}$.0$^{3,8}$.0$^{12,17}$]-5-docosene derivatives such as
octacyclo[8.8.0.1$^{2,9}$.1$^{4,7}$.1$^{11,18}$.1$^{13,16}$.0$^{3,8}$.0$^{12,17}$]-5-docosene,
15-methyloctacyclo[8.8.0.1$^{2,9}$.1$^{4,7}$.1$^{11,18}$.1$^{13,16}$.0$^{3,8}$.0$^{12,17}$]-5-docosene, and
15-ethyloctacyclo[8.8.0.1$^{2,9}$.1$^{4,7}$.1$^{11,18}$.1$^{13,16}$.0$^{3,8}$.0$^{12,17}$]-5-docosene;
pentacyclo[6.6.1.1$^{3,6}$.0$^{2,7}$.0$^{9,14}$]-4-hexadecene derivatives such as
pentacyclo[6.6.1.1$^{3,6}$.0$^{2,7}$.0$^{9,14}$]-4-hexadecene
1,3-dimethylpentacyclo[6.6.1.1$^{3,6}$.0$^{2,7}$.0$^{9,14}$]-4-hexadecene,
1,6-dimethylpentacyclo[6.6.1.1$^{3,6}$.0$^{2,7}$.0$^{9,14}$]-4-hexadecene and
15,16-dimethylpentacyclo[6.6.1.$^{3,6}$.0$^{9,14}$]-4-hexadecene;
heptacyclo-5-eicosene derivatives or heptacyclo-5-heneicosene derivatives such as
heptacyclo[8.7.0.1$^{2,9}$.1$^{4,7}$.1$^{11,18}$.0$^{3,8}$.0$^{12,16}$]-5-eicosene and
heptacyclo[8.8.0.1$^{2,9}$.1$^{4,7}$.1$^{11,18}$.0$^{3,8}$.0$^{12,17}$]-5heneicosene;
tricyclo[4.3.0.1$^{2,5}$]-3-decene derivatives such as
tricyclo[4.3.0.1$^{2,5}$]-3-decene, 2-methyltricyclo[4.3.0.1$^{2,5}$]-3-decene and
5-methyltricyclo[4.3.0.1$^{2,5}$]-3-decene;
tricyclo[4.4.0.1$^{2,5}$]-3-undecene derivatives such as
tricyclo[4.4.0.1$^{2,5}$]-3-undecene and
10-methyltricyclo[4.4.0.1$^{2,5}$]-3-undecene;
pentacyclo[6.5.1.1$^{3,6}$.0$^{2,7}$.0$^{9,13}$]-4-pentadecene derivatives such as
pentacyclo[6.5.1.1$^{3,6}$.0$^{2,7}$.0$^{9,13}$]-4-pentadecene,
1,3-dimethylpentacyclo[6.5.1.1$^{3,6}$.0$^{2,7}$.0$^{9,13}$]-4-pentadecene,
1,6-dimethylpentacyclo[6.5.1.1$^{3,6}$.0$^{2,7}$.0$^{9,13}$]-4-pentadecene and
14,15-dimethylpentacyclo[6.5.1.1$^{3,6}$.0$^{2,7}$.0$^{9,13}$]-4-pentadecene; diene compounds such as
pentacyclo[6.5.1.1$^{3,6}$.0$^{2,7}$.0$^{9,13}$]-4,10-pentadecadiene;
pentacyclo[7.4.0.1$^{2,5}$.1$^{9,12}$.0$^{8,13}$]-3-pentadecene derivatives such as
pentacyclo[7.4.0.1$^{2,5}$.1$^{9,12}$.0$^{8,13}$]-3-pentadecene and
methyl-substituted pentacyclo[7.4.0.1$^{2,5}$.1$^{9,12}$.0$^{8,13}$]-3-pentadecene;
heptacyclo[8.7.0.1$^{3,6}$.1$^{10,17}$.0$^{12,15}$.0$^{2,7}$.0$^{11,16}$]-4-eicosene derivatives such as
heptacyclo[8.7.0.1$^{3,6}$.1$^{10,17}$.1$^{12,15}$.0$^{2,7}$0$^{11,16}$]-4-eicosene and
dimethyl-substituted heptacyclo[8.7.0.1$^{3,6}$.1$^{10,17}$.1$^{12,15}$.0$^{2,7}$.0$^{11,16}$]-4-eicosene;
nonacyclo[10.9.11$^{4,7}$.1$^{13,20}$.0.1$^{15,18}$.0$^{2,10}$.0$^{12,21}$.0$^{14,19}$]-5-pentacosene derivatives such as
nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene and
trimethyl-substituted nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene;
pentacyclo[8.4.0.1$^{2,5}$.1$^{9,12}$.0$^{8,13}$]-3-hexadecene derivatives such as
pentacyclo[8.4.0.1$^{2,5}$.1$^{9,12}$.0$^{8,13}$]-3-hexadecene,
11-methylpentacyclo[8.4.0.1$^{2,5}$.1$^{9,12}$.0$^{8,13}$]-3-hexadecene,
11-ethylpentacyclo[8.4.0.1$^{2,5}$.1$^{9,12}$.0$^{8,13}$]-3-hexadecene and
10,11-dimethylpentacyclo[8.4.0.1$^{2,5}$.1$^{9,12}$.0$^{8,13}$]-5-hexadecene;
heptacyclo[8.8.0.1$^{4,7}$.1$^{11,18}$.1$^{13,16}$.0$^{3,8}$.0$^{12,17}$]-5-heneicosene derivatives such as
heptacyclo[8.8.0.1$^{4,7}$.1$^{11,18}$.1$^{13,16}$.0$^{3,8}$.1$^{12,17}$]-5heneicosene,
15-methylheptacyclo[8.8.0.1$^{4,7}$.1$^{11,18}$.1$^{13,16}$.0$^{3,8}$.0$^{12,17}$]-5-heneicosene and
trimethylheptacyclo[8.8.0.1$^{4,7}$.1$^{11,18}$.1$^{13,16}$.0$^{3,8}$.0$^{12,17}$]-5heneicosene;
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivative such as
nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene;
pentacyclo[6.5.1.1$^{3,6}$.0$^{2,7}$.0$^{9,13}$]-4,11-pentadecadiene,
methyl-substituted pentacyclo[6.5.1.1$^{3,6}$.0$^{2,7}$.0$^{9,13}$]-4,11-pentadecadiene,
trimethyl-substituted pentacyclo[4.7.0.1$^{2,5}$.0$^{8,13}$.1$^{9,12}$]-3-pentadecene,
pentacyclo[4.7.0.1$^{2,5}$.0$^{8,13}$.1$^{9,12}$]-3,10-pentadecadiene,
methyl-substituted pentacyclo[4.7.0.1$^{2,5}$.0$^{8,13}$.1$^{9,12}$]-3,10-pentadecadiene,
methyl-substituted heptacyclo[7.8.0.1$^{3,6}$.0$^{2,7}$.1$^{10,17}$.0$^{1,16}$.1$^{12,15}$]-4-eicosene,
trimethyl-substituted heptacyclo[7.8.0.1$^{3,6}$.0$^{2,7}$.1$^{10,17}$.0$^{11,16}$.1$^{12,15}$]-4-eicosene,
tetramethyl-substituted heptacyclo[7.8.0.1$^{3,6}$.0$^{2,7}$.1$^{10,17}$.0$^{11,16}$.1$^{12,15}$]-4-eicosene,
tricyclo[4.3.0.1$^{2,5}$]-3,7-decadiene (i.e., dicyclopentadiene),
2,3-dihydrodicyclopentadiene,
5-phenylbicyclo[2.2.1]hepto-2-ene (i.e., 5-phenyl-2-norbornen),
5-methyl-5-phenylbicyclo [2.2.1]hepto-2-ene,
5-benzylbicyclo[2.2.1]hepto-2-ene,
5-tolylbicyclo[2.2.1]hepto-2-ene,
5-(ethylphenyl)-bicyclo[2.2.1]hepto-2-ene,
5-(isopropylphenyl)-bicyclo[2.2.1]hepto-2-ene,
8-phenyltetracyclo[4.4.0.1$^{2,5}$.1$^{7,10}$]-3-dodecene,
8-methyl-8-phenyltetracyclo[4.4.0.1$^{2,5}$.1$^{7,10}$]-3-dodecene,
8-benzyltetracyclo[4.4.0.1$^{2,5}$.1$^{7,10}$]-3-dodecene,
8-tolyltetracyclo[4.4.0.1$^{2,5}$.1$^{7,10}$]-3-dodecene,
8-(ethylphenyl)-tetracyclo[4.4.0.1$^{2,5}$.1$^{7,10}$]-3-dodecene,
8-(isopropylphenyl)-tetracyclo[4.4.0.1$^{2,5}$.1$^{7,10}$]-3-dodecene,
8,9-diphenyltetracyclo[4.4.0.1$^{2,5}$.1$^{7,10}$]-3-dodecene,
8-(biphenyl)-tetracyclo[4.4.0.1$^{2,5}$.1$^{7,10}$]-3-dodecene,
8-(β-naphthyl)-tetracyclo[4.4.0.1$^{2,5}$.1$^{7,10}$]-3-dodecene,
8-(α-naphthyl)-tetracyclo[4.4.0.1$^{2,5}$.1$^{7,10}$]-3-dodecene,
8-(anthracenyl)-tetracyclo[4.4.0.1$^{2,5}$.1$^{7,10}$]-3-dodecene,
11-phenylhexacyclo[6.6.1.1$^{3,6}$.0$^{2,7}$.0$^{9,14}$]-4-heptadecene,
6-(α-naphthyl)-bicyclo[2.2.1]-hepto-2-ene,
5-(anthracenyl)-bicyclo[2.2.1]-hepto-2-ene,
5-(biphenyl)-bicyclo[2.2.1]-hepto-2-ene, 5-(β-naphthyl)-bicyclo[2.2.1]-hepto-2-ene,
5,6-diphenylbicyclo[2.2.1]-hepto-2-ene,
9-(2-norbomen-5-yl)-carbazole and
1,4-methano-1,4,4a,4b,5,8,8a,9a-octahydrofluorene compounds;
1,4-methano-1,4,4a,9a-tetrahydrofluorene compounds such as
1,4-methano-1,4,4a,9a-tetrahydrofluorene,
1,4-methano-8-methyl-1,4,4a,9a-tetrahydrofluorene,
1,4-methano-8-chloro-1,4,4a,9a-tetrahydrofluorene and
1,4-methano-8-bromo-1,4,4a,9a-tetrahydrofluorene;
1,4-methano-1,4,4a,9a-tetrahydrodibenzofuran compounds;
1,4-methano-1,4,4a,9a-tetrahydrocarbazole compounds such as
1,4-methano-1,4,4a,9a-tetrahydrocarbazole and
1,4-methano-9-phenyl-1,4,4a,9a-tetrahydrocarbazole;
1,4-methano-1,4,4a,5,10,10a-hexahydroanthracene compounds such as
1,4-methano-1,4,4a,5,10,10a-hexahydroanthracene;
7,10-methano-6b,7,10,10a-tetrahydrofluoranthene compounds;
cyclopentadiene-acenaphthylene adduct further reacted with cyclopentadiene,
11,12-benzo-pentacyclo[$6.5.1.1^{3,6}.0^{2,7}.0^{9,13}$]-4-pentadecene,
11,12-benzo-pentacyclo[$6.6.1.1^{3,6}.0^{2,7}.0^{9,14}$]-4-hexadecene,
14,15-benzo-heptacyclo[$8.7.0.1^{2,9}.1^{4,7}.0^{11,17}.0^{3,8}.0^{12,16}$]-5-eicosene and cyclopentadiene-acenaphthylene adduct.
These cycloolefinic monomers may homopolymerized or copolymerized with one or more different cycloolefinic monomer listed above.

The hydrogenated ring-opened polymers or copolymers of the cycloolefin monomer may be prepared by the methods described, for example, in Japanese Laid-Open Patent Publication Nos. 60-26024, 63-218727 and 63-23201, herein incorporated by reference. In these methods, for example, the cycloolefin monomer is typically polymerized in the presence of a polymerization catalyst comprising a metal compound, and then the resulting polymer is hydrogenated by well-known methods. Such hydrogenation methods typically include hydrogenating the polymer in the presence of a catalyst generally used for hydrogenation of olefin compounds.

The random copolymer of cycloolefinic monomers with ethylene may be prepared, for example, by the method described in Japanese Laid-Open Patent Publication No. 60-168708, herein incorporated by reference, in which the polymerization is carried out in the presence of a catalyst comprising a vanadium compound and a halogen-containing, organo-aluminum compound. The molar fraction of ethylene is preferably 40 to 90%.

The amorphous resin-containing layer (B) comprises 0 to 85 wt % of the polyolefinic resin, and 15 to 100 wt % of the amorphous resin. If the amount of amorphous resin is less than 15 wt %, the resulting film will have reduced resistance to solvent attack. Preferably, the amount of polyolefinic resin is 20 to 80 wt %, and the amount of the amorphous resin is 20 to 80 wt %.

The porosity of the amorphous resin-containing layer (B) must be 5% or less, and is more preferably 3% or less. (As for the base layer (A), the porosity of the amorphous resin-containing layer (B) is the ratio of the cross-sectional area of the voids in the amorphous resin-containing layer (B) to the total cross-sectional area of this layer, as measured by a cross-section of the multi-layered stretched resin film with a scanning electron microscope.) If the porosity exceeds 5%, the vehicle (in particular high-boiling-point, petroleum-base solvent such as mineral oil) in the offset printing ink will penetrate through the voids to reach the base layer (A), thereby causing the entire film to swell (i.e., so-called solvent attack). An inorganic fine powder or an organic filler may also be added to the amorphous resin-containing layer (B) as long as the porosity of this layer is 5% or less. The inorganic fine powder or organic filler of the amorphous resin-containing layer may be the same or different from that of the base layer (A).

The mechanism by which the films of the present invention resist surface waving or curling is not precisely known. However, it is believed that the surface waving or curling is prevented because the amorphous resin added to the amorphous resin-containing layer (B) can effectively suppress the swelling of the amorphous resin-containing layer (B) due to the vehicle (in particular high-boiling-point, petroleum-base solvent such as mineral oil) in the offset printing ink, and because the relative scarcity of voids in the amorphous resin-containing layer (B) makes it difficult for the vehicle to penetrate the amorphous resin-containing layer (B) to reach the base layer (A). Both of these factors appear to effectively prevent the multi-layered resin film of the present invention from becoming swollen by the vehicle. Thus the multi-layered stretched resin film of the present invention can be printed with general-purpose, quick-drying (drying oil type) offset printing inks.

The thickness of the amorphous resin-containing layer (B) is preferably 1 to 100 μm.

Surface Layer (C)

The surface layer (C) comprises a polyolefinic resin. There is no special limitation on the type of polyolefinic resin of the surface layer (C), and those listed above for the base layer (A) may be used. The polyolefinic resin of the surface layer (C) preferably has a melting point (peak temperature in a DSC curve) of 130 to 210° C. A propylene homopolymer having a melting point (peak temperature in a DSC curve) of 155 to 174° C., a melt flow rate (JIS K-7210) of 0.5 to 20 g/10 minutes and a crystallinity of 45 to 70% is preferred. The surface layer (C), may comprise a single polyolefin, or a combination of two or more polyolefins, such as those listed above. The polyolefinic resin of the surface layer (C) may be the same or different from the polyolefinic resin of the base layer (A) and the amorphous resin-containing layer (B).

The surface layer (C) may further comprise an inorganic fine powder or organic filler. The inorganic fine powder of the surface layer (C) preferably has an average grain size of 0.01 to 6 μm, more preferably 0.05 to 4 μm, and still more preferably 0.07 to 2 μm. The organic filler of the surface layer (C) preferably has an average dispersion grain size of 0.01 to 6 μm, more preferably 0.05 to 4 μm, and still more preferably 0.07 to 2 μm.

Examples of the inorganic fine powder include heavy calcium carbonate, precipitated calcium carbonate, fired clay, talc, titanium oxide, barium sulfate, aluminum sulfate, silica, zinc oxide, magnesium oxide and diatom earth. Surface modified products of the above inorganic fine powders using various surface modifiers may also be used. Heavy calcium carbonate, precipitated calcium carbonate, surface modified products of these calcium carbonates, clay and diatom earth are preferred because they are inexpensive and have good void forming properties during stretching. Surface modified heavy calcium carbonate and precipitated calcium carbonate, using various surface modifiers, are more preferred. Examples of such surface modifiers include resin acids, aliphatic acids, organic acids, sulfate ester type anionic surfactants, sulfonate type anionic surfactants, petroleum resin acids, and sodium, potassium or ammonium salts thereof, or aliphatic esters, or aliphatic acid esters or resin acid esters thereof, wax and paraffin. Nonionic surfactant, diene-base polymer, titanate coupling agents, silane coupling agents and phosphate coupling agents are more preferred. Examples of the sulfate-ester-type anionic surfactants include long-chain alcohol sulfate esters, polyoxyethylenealkylether sulfate esters, sulfated oils, and sodium or potassium salts thereof; examples of the sulfonate-type anionic surfactants include alkylbenzenesulfonic acids, alkylnaphthalenesulfonic acids, paraffinsulfonic acids, α-olefinsulfonic acids, alkylsulfosuccinic acids, and sodium or potassium salts thereof. Examples of the aliphatic acid include caproic acid, caprylic acid, pelargonic acid, capric acid, undecanoic acid, lauric acid, myristic acid, palmitic acid, stearic acid, behenic acid, oleic acid, linoleic acid, linolenic acid and eleostearic acid; examples of the organic acid include maleic acid and sorbic acid; examples of diene-base polymers include polybutadiene and isoprene; and examples of nonionic surfactants include polyethyleneglycol ester type surfactants. These surface modifiers may be used individually or in combinations of two or more.

The organic filler may be, for example, polyethylene terephthalate, polybutylene terepbthalate, polyamide, polycarbonate, polyethylene naphthalate, polystyrene, melamine resin, cyclopolyolefin, polyethylene sulfite, polyimide, polyethyl ether ketone and polyphenylene sulfite. Preferred organic fillers are incompatible inorganic fillers having a higher melting point or glass transition temperature than that of the polyolefinic resin with which they are combined. Such organic fillers provide good void formation properties.

The surface layer (C) may have a single type of inorganic fine powder or organic filler, selected from those described above, or two or more such inorganic fine powders or organic fillers may be combined. For example, two or more inorganic fine powders may be combined, two or more organic fillers may be combined, or one or more inorganic fine powders may be combined with one or more organic fillers. The inorganic fine powder or organic filler of the surface layer (C) may be the same or different from the inorganic fine powder and organic filler of the base layer (A) or the amorphous resin-containing layer (B).

The thickness of the surface layer (C) is preferably 1 to 100 μm, and is more preferably 1.5 to 50 μm.

Intermediate Layer (D)

In order to add a paper-like texture to the multi-layered stretched resin film of the present invention, an intermediate layer (D) may be provided between the base layer (A) and amorphous resin-containing layer (B), or between the base layer (A) and surface layer (C). The intermediate layer (D) comprises a polyolefinic resin and an inorganic fine powder or organic filler. The polyolefinic resin, inorganic fine powder and organic filler of the intermediate layer (D) may be any of those listed above in the description of the base layer (A). In particular, propylene-based resins are the preferred polyolefinic resin. Inorganic fine powders are preferred over organic fillers. In order to further improve the stretching properties, a small amount of a low-melting-point resin such as propylene-base copolymer, high-density polyethylene, polystyrene and ethylene-vinyl acetate copolymer may also be added. The polyolefinic resin of the intermediate layer (D) may be the same or different from the polyolefinic resins of the base layer (A), the amorphous resin-containing layer (B), and the surface layer (C). The inorganic fine powder or organic filler may be the same or different from those of the base layer (A), the amorphous resin-containing layer (B), or the surface layer (C).

The intermediate layer (D) preferably comprises 45 to 98 wt % of the polyolefinic resin and 2 to 55 wt % of the inorganic fine powder or organic filler, and more preferably comprises 45 to 98 wt % of the propylene-base resin and 2 to 55 wt % of the inorganic fine powder.

The thickness of the intermediate layer (D) is preferably 1 to 200 μm, and more preferably 2 to 100 μm.

Preparation of Multi-Layered Stretched Resin Film

The multi-layered stretched resin film of the present invention may be prepared by any suitable method, and is not limited to the preferred methods described below.

The multi-layered stretched resin film of the present invention may be produced by first kneading a resin composition for the base layer (A) under conditions in which the components of the resin composition fuse, extruding the kneaded resin in a sheet form; stretching the sheet 4 to 7-fold in the longitudinal direction by means of the difference in the peripheral speeds of a number of roller groups; separately kneading a resin composition for the amorphous resin-containing layer (B) under conditions which fuse the components of the resin composition for the amorphous resin-containing layer (B), then laminating a sheet of the amorphous resin-containing layer (B) on at least one surface of the stretched base layer (A); stretching in the transverse direction the resulting laminate 4 to 12-fold using a tenter at a temperature 10° C. or more higher than the glass transition temperature of the amorphous resin; and then subjecting the resulting film to annealing and cooling.

Another process for preparing the multi-layered stretched resin film of the present invention entails separately kneading resin compositions for the base layer (A) and the amorphous resin-containing layer (B) under conditions which fuse the components of these compositions, then co-extruding or laminating these resin compositions for the respective layers (A) and (B) in sheet form, whereby the amorphous resin-containing layer (B) is disposed on the outside of the laminate or co-extrudate, then stretching the resulting multilayered sheet 4 to 7-fold in the longitudinal direction by means of the difference in the peripheral speeds of a number of roller groups, at a temperature 10° C. or more higher than the glass transition temperature of the amorphous resin, followed by further stretching of the sheet 4 to 12-fold in the transverse direction using a tenter at a temperature 10° C. or more higher than the glass transition temperature of the amorphous resin. Finally, the resulting film is then subjected to annealing and cooling.

A third process for preparing the multi-layered stretched resin film of the present invention is to separately knead the resin compositions for the base layer (A) and the amorphous resin-containing layer (B) under conditions in which the components of the resin compositions fuse, co-extruding or laminating the resin compositions of the (A) and (B) layers in sheet form, whereby the amorphous resin-containing layer (B) is disposed on the outside of the sheet, stretching the resulting sheet 4 to 7-fold in the longitudinal direction by means of the difference in the peripheral speeds of a number of roller groups at a temperature 10° C. or more higher than the glass transition temperature of the amorphous resin, subjecting the resulting film to annealing and cooling.

The multi-layered stretched resin film of the present invention comprising the base layer (A), amorphous resin-containing layer (B) and surface layer (C) may be prepared by first kneading the resin composition for the base layer (A) under conditions in which the components of the composition fuse, extruding the kneaded composition in sheet form, stretching the resulting sheet 4 to 7-fold in the longitudinal direction by means of the difference in the peripheral speeds of a number of roller groups, laminating thereon resin compositions for the amorphous resin-containing layer (B) and surface layer (C), which were each prepared by separately kneaded resin compositions for the respective layers under conditions in which the components of the resin compositions fuse, thereby providing the desired multi-layered structure, stretching the resulting sheet 4 to 12-fold using a tenter in the transverse direction at a temperature 10° C. or more higher than the glass transition temperature of the amorphous resin, annealing and then cooling the resultant film.

Another process for preparing a multi-layered stretched film sheet includes separately kneading resin compositions for the base layer (A), amorphous resin-containing layer (B) and surface layer (C) under conditions which fuse the components of the respective resin compositions, then co-extruding the respective resin compositions in sheet form so as to provide the desired multi-layered structure, stretching the resulting sheet 4 to 7-fold in the longitudinal direction by means of the difference in the peripheral speeds of a number of roller groups at a temperature 10° C. or more higher than the glass transition temperature of the amorphous resin, and stretching the resulting sheet 4 to 12-fold using a tenter in the transverse direction, again at a temperature 10° C. or more higher than the glass transition temperature of the amorphous resin, followed by annealing and cooling.

Another process for preparing the multi-layered stretched resin films of the present invention comprises separately kneading the resin compositions for the base layer (A), amorphous resin-containing layer (B) and surface layer (C) under conditions in which the components of the respective resin layers are fused, co-extruding the resin compositions in sheet form so as to provide the desired multi-layered structure, stretching the resulting sheet 4 to 7-fold in the longitudinal direction by means of the difference in the peripheral speeds of a number of roller groups at a temperature 10° C. or more higher than the glass transition temperature of the amorphous resin, then annealing and cooling the stretched sheet.

Multi-layered stretched resin films according to the present invention, having the intermediate layer (D), may be produced in the same manner, except that process further comprises kneading and laminating, or co-extruding a resin composition for the intermediate layer (D).

The multi-layered stretched resin film of the present invention preferably has an opacity (measured in compliance with JIS P-8138, herein incorporated by reference) of less than 70%, and more preferably 20% or above and less than 70%.

The thickness of the multi-layered stretched resin film of the present invention is preferably 30 to 450 $\mu$m.

The multi-layered stretched resin film of the present invention comprises a layer structure (B)/(A). The multi-layered stretched resin film of the present invention more preferably comprises a layer structure (C)/(B)/(A), which specifically includes structures such as (C)/(B)/(A)/(B)/(C), (C)/(B)/(A)/(B), (C)/(B)/(A)/(C) and (C)/(B)/(A). (The notation "(B)/(A)" represents a multi-layered film structure in which the amorphous resin-containing layer (B) is disposed on the base layer (A).) An additional layer such as the above-described intermediate layer (D), other than the base layer (A), amorphous resin-containing layer (B) and surface layer (C), may be disposed between any of the adjacent layers described above. The additional intermediate layer (D) may be selected depending on the nature of the application and the desired function of the multi-layered stretched resin film.

In order to improve the offset printing property, the surface of the multi-layered stretched resin film may also be modified by corona discharge treatment, flame treatment or by coating the film with a water-soluble primer selected from the group consisting of ethyleneimine adducts such as polyethyleneimine, butylated polyethyleneimine, hydroxypropylated polyethyleneimine, hydroxyethylated polyethyleneimine, 2,3-dihydroxypropylated polyethyleneimine, poly(ethyleneimine-urea), and polyamine polyamide; epichlorohydrin adducts such as polyamine polyamides; and ternary or quaternary nitrogen-containing acrylic resins.

In order to further improve the offset printing properties of the multi-layered stretched resin film of the present invention, a pigment coated layer may be provided on at least the outermost layer of the surface to be printed. Such a pigment coated layer may be formed by conventional pigment coating methods, for example those used to produce coated paper.

The pigment coating material may be, for example, a latex conventionally used for producing such coated layers, comprising 30 to 80 wt % of a pigment such as clay, talc, calcium carbonate, magnesium carbonate, aluminum hydroxide, silica, calcium silicate or plastic pigment, and 20 to 70 wt % of an adhesive.

Examples of the adhesive which may be used in the pigment coating material may include latices such as SBR (styrene-butadiene copolymeric rubber), MBR (methacrylate-butadiene copolymeric rubber); acrylic emulsions, starchs, PVA (polyvinyl alcohol), CMC (carboxymethyl cellulose) and methyl cellulose.

The pigment coating material may comprise a dispersion aid, for example those comprising a special sodium polycarboxylate such as acrylic acid/sodium acrylate copolymer, or a crosslinking agent such as polyamide-urea-base resin. The pigment coating material is generally in the form of a water-soluble coating agent having a solid content of 15 to 70 wt %, and more preferably 35 to 65 wt %.

The coating material may be coated onto the multi-layered stretched resin film by methods such as gravure coating, Mayer bar coating, roll coating, blade coating or size press coating. The amount of coating applied is generally 0.01 to 20 g/m, and more preferably 0.1 to 15 g/m$^2$.

EXAMPLES

The present invention will be further described by the specific Examples, Comparative Examples and Test Examples herein. The materials used, the amount and ratio used, and the specific process steps and the like may be modified without departing from the spirit of the present invention. Thus, the present invention is by no means limited to the specific examples described below.

Details of the amorphous resins, polyolefinic resins and inorganic fine powders used in the Examples and Comparative Examples are listed in Table 2.

TABLE 2

Details of Amorphous Resins, Polyolefinic Resins and Inorganic Fine Powders

| Symbol | Name of material | Trade name | Description |
|---|---|---|---|
| | (Amorphous resin) | | |
| a | cycloolefin-ethylene copolymer | Mitsui Chemicals, Inc., APL6015 | glass transition point = 140° C. |
| b | cycloolefin-ethylene copolymer | Mitsui Chemicals, Inc., APL6013 | glass transition point = 125° C. |
| c | cycloolefin-ethylene copolymer | Mitsui Chemicals, Inc., APL6509 | glass transition point = 80° C. |
| d | cycloolefin-ethylene copolymer | Mitsui Chemicals, Inc., APL5018 | glass transition point = 160° C. |
| e | cycloolefin-ethylene copolymer | Mitsui Chemicals, Inc., APL6011 | glass transition point = 105° C. |
| f | cycloolefinic polymer | Zeon Corporation, Zeonor 1020R | glass transition point = 105° C. |
| g | atactic polystyrene | A&M Polystyrene Co., Ltd., GPPS-G8259 | glass transition point = 100° C. |
| | (Polyolefinic resin) | | |
| α | highly-crystallized propylene homopolymer | Japan Polychem Corpotaion, MA4U | MFR = 5.0 g/10 min, crystallinity = 60%, melting peak temperature = 165° C., melting completion temperature = 171° C., |
| β | propylene homopolymer | Japan Polychem Corpotaion, MA4 | MFR = 5.0 g/10 min, Melting peak temperature = 160° C., Melting completion temperature = 167° C. |
| γ | ethylene homopolymer | Japan Polychem Corpotaion, HJ360 | MFR = 5.5 g/10 min, melting peak temperature = 130° C., melting completion temperature = 135° C. |
| | (Inorganic Fine powder) | | |
| A | surface-modified precipitated calcium carbonate | Maruo Calcium Co., Ltd., MC-S5 | average grain size = 0.1 μm, modified with aliphatic acid and sulfonic acid |
| B | surface-modified precipitated calcium carbonate | Maruo Calcium Co., Ltd., MSK-PO | average grain size = 0.15 μm, modified with aliphatic acid |
| C | precipitated calcium carbonate | Shiroichi Kogyo K.K., Brilliant-15 | average grain size = 0.15 μm |
| D | heavy calcium carbonate | Bihoku Funka Kogyo K.K., Softon #3200 | average grain size = 0.7 μm |
| E | heavy calcium carbonate | Bihoku Funka Kogyo K.K., Softon #1800 | average grain size = 1.25 μm |
| F | surface-modified heavy calcium carbonate | Maruo Calcium Co., Ltd., Nanocoat S-25 | average grain size = 1.1 μm modified with aliphatic acid |

Examples 1 and 4 to 13

A composition (A) was prepared by mixing 87 wt % of a propylene homopolymer having a melt flow rate (MFR) of 0.8 g/10 minutes (peak melting temperature =160° C., melting completion temperature =167° C.) and 8 wt % of a high-density polyethylene, and by further adding thereto 5 wt % of calcium carbonate having an average grain size of 1.5 μm. The composition (A) was kneaded in an extruder set at 270° C., extruded from a die in sheet form, and then cooled using a cooling apparatus to thereby produce an unstretched sheet. The sheet was re-heated up to 155° C. and stretched 5-fold in the longitudinal direction by means of the difference in the peripheral speeds of a number of roller groups.

A composition (B) was separately prepared by mixing an amorphous resin with a polyolefinic resin, both listed in Table 3, in an amount listed in Table 3. The composition (B) was kneaded in an extruder set at 270° C., extruded from a die in a sheet form, and the resulting sheet was then laminated on one surface of the above-described 5-fold stretched sheet (A). The sheet (B) was also laminated on the opposite surface of the 5-fold stretched sheet to thereby obtain a three-layered laminate.

The three-layered laminate was heated to 175° C., stretched 7.5-fold in the transverse direction using a tenter to thereby obtain a three-layered film. The surface of this three-layered film was subjected to corona discharge treatment to thereby provide a three-layered stretched resin film having a structure expressed as (B)/(A)/(B) (15 μm/80 μm/15 μm thick, respectively).

The same procedures were repeated with different types and amounts of amorphous and polyolefinic resins in the amorphous resin-containing layer (B), thereby providing 11 different multi-layered stretched resin films corresponding to Examples 1 and 4 to 13.

Example 2

A three-layered stretched resin film was prepared as described in Example 1, except that the composition (A) was prepared by mixing 90 wt % of a propylene homopolymer having a melt flow rate (MFR) of 0.8 g/10 minutes (peak melting temperature =160° C., melting completion temperature =167° C.) and 8 wt % of a high-density polyethylene, and by further adding thereto 2 wt % of calcium carbonate having an average grain size of 1.5 μm. The composition (B) was prepared using the materials listed in Table 3 in amounts listed in Table 3.

Example 3

A three-layered stretched resin film was prepared as described in Example 1, except that the composition (A) was prepared by mixing 84 wt % of a propylene homopolymer having a melt flow rate (MFR) of 0.8 g/10 minutes (peak melting temperature=160° C., melting completion temperature =167° C.) and 8 wt % of a high-density polyethylene, and by further adding thereto 8 wt % of calcium carbonate having an average grain size of 1.5 μm. The composition (B) was prepared using materials listed in Table 3 in amounts listed in Table 3.

Example 14

A composition (A) was prepared by mixing 90 wt % of a propylene homopolymer having a melt flow rate (MFR) of 0.8 g/10 minutes (peak melting temperature 160° C., melting completion temperature =167° C.) and 8 wt % of a high-density polyethylene, and by further adding thereto 2 wt % of calcium carbonate having an average grain size of 1.5 μm. The composition (A) was kneaded in an extruder set at 270° C., extruded from a die in sheet form, and then cooled using a cooling apparatus to thereby provide an unstretched sheet. The sheet was re-heated up to 155° C. and stretched 5-fold in the longitudinal direction by means of the difference in the peripheral speeds of a number of roller groups.

A composition (B) was separately prepared by mixing an amorphous resin with a polyolefinic resin, both listed in Table 3, in amounts listed in Table 3. The composition (D) was prepared by mixing 70 wt % of a propylene homopolymer having a melt flow rate (MFR) of 4.0 g/10 minutes (peak melting temperature=160° C., melting completion temperature=167° C.) and 30 wt % of a calcium carbonate having an average grain size of 1.5 μm. The compositions (B) and (D) were separately kneaded in individual extruders set at 270° C., stacked in a single die and then co-extruded therefrom, and the resulting sheet was then laminated on both surfaces of the above-described 5-fold stretched sheet (A) so that the layer (B) was disposed on the outside of the laminate, thereby providing a sheet with a five-layered structure.

The five-layered structure was then heated to 165° C., stretched 7.5-fold in the transverse direction using a tenter, thereby providing a five-layered film. The surface of this five-layered film was subjected to corona discharge treatment to provide a five-layered stretched resin film having a structure expressed as (B)/(D)/(A)/(D)/(B) (5 μm/25 μm/70 μm/25 μm/5 μm thick, respectively).

Comparative Example 1

A five-layered stretched resin film was prepared as described in Example 14, except that the composition (B) was prepared by mixing 55 wt % of a propylene homopolymer having a melt flow rate (FR) of 5.0 g/10 minutes (peak melting temperature=160° C., melting completion temperature=167° C.) and 45 wt % of calcium carbonate having an average grain size of 1.5 μm.

Example 15

A composition (A) was prepared by mixing 88 wt % of a propylene homopolymer having a melt flow rate (MFR) of 0.8 g/10 minutes (peak melting temperature=160° C., melting completion temperature=167° C.) and 10 wt % of a high-density polyethylene, and by further adding thereto 2 wt % of calcium carbonate having an average grain size of 1.5 μm. A composition (B) was separately prepared by mixing an amorphous resin with a polyolefinic resin, both listed in Table 3, in amounts listed in Table 3. These compositions (A) and (B) were separately kneaded in individual extruders set at 270° C., stacked in a single die so as to attain a stack structure of (B)/(A)/(B), co-extruded therefrom in a sheet form, and then cooled using a cooling apparatus to provide an unstretched film. The resulting sheet was heated at 155° C., stretched 5-fold in the longitudinal direction by means of the difference in the peripheral speeds of a number of roller groups. The three-layered sheet was then heated to 175° C., and was then stretched 7.5-fold in the transverse direction using a tenter, thereby providing a three-layered film. The surface of this three-layered film was subjected to corona discharge treatment, thereby providing a three-layered stretched resin film having a structure expressed as (B)/(A)/(B) (5 μm/50 μm/5 μm thick, respectively).

Example 16

A composition (A) was prepared by mixing 87 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 5 wt % of calcium carbonate having an average grain size of 1.5 μm. A composition (B) was separately prepared by mixing an amorphous resin with a polyolefinic resin, both listed in Table 3, in an amount listed in Table 3. These compositions (A) and (B) were separately kneaded in individual extruders set at 270° C., co-extruded therefrom in sheet form so as to provide a layer structure of (B)/(A)/(B), and then cooled using a cooling apparatus to provide an unstretched film. The resulting sheet was heated at 155° C., stretched 5-fold in the longitudinal direction by means of the difference in the peripheral speeds of a number of roller groups to provide a three-layered film. This three-layered film was then subjected to corona discharge treatment, thereby providing a three-layered stretched resin film having a structure expressed as (B)/(A)/(B) (15 μm/100 μm/15 μm thick, respectively).

Examples 17 to 22

A water-soluble coating material was individually coated on one side of the multi-layered stretched resin films prepared in Examples 4, 6, 9, and 14 to 16, so as to form a 2 g/m² coated film. The coating material comprises 20 wt % of precipitated calcium carbonate (product of Shiroishi Kogyo K. K., BRILLIANT-15), 5 wt % of kaolin clay (product of Engelhard Corporation, ULTRAWHITE-90), 75 wt % of silica-compounded acrylic emulsion (product of Clariant Polymers K. K., MOVINYL M8010) and 5 wt % of a specialized modified polyvinyl alcohol (product of Nippon Synthetic Chemical Industry Co., Ltd., GOHSEPHIMAR Z-100), wherein amounts herein are expressed in terms of the solid content. After coating onto the multi-layered stretched resin films, the coating was dried at 105° C. for 1 minute to provide a coated film.

In addition, the precipitated calcium carbonate and kaolin gray herein were individually added with a dispersion aid comprising 0.5 weight parts of a specialized sodium polycarboxylate (product of Kao Corporation, POIZ 520) per 100 weight parts of the powders, and the polyvinyl alcohol was added with 10 weight parts of a polyamide urea-base resin crosslinking agent (product of Sumitomo Chemical, SUMIREZ RESIN 633) per 100 weight parts of the polyvinyl alcohol.

Test Example 1

Figure 2:
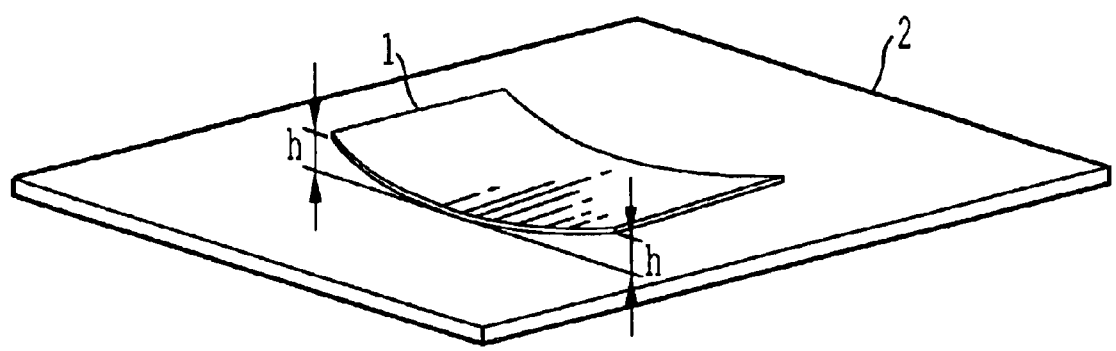
FIG. 2 is a schematic view describing how curl height is measured. The reference numeral 1 represents a printed sheet, 2 represents a flat table, and h represents the curl height.

The multi-layered stretched resin films obtained in Examples 1 to 22 and Comparative Example 1 were tested to evaluate their porosity and opacity, their suitability for offset printing (i.e., curl height, waving after printing with a commercial printing machine, and ink drying properties. The results are shown in Tables 3 and 4.
(1) Porosity The porosity (%) of the amorphous resin-containing layer (B) is determined by observing a cross-section of the multi-layered stretched film under a scanning electron microscope, and then estimating the ratio of the area of the voids to the total area of the amorphous resin-containing layer (B).
(2) Opacity Opacity was measured in compliance with JIS P-8138.
(3) Curl Height The entire surface of the multi-layered stretched resin film to be evaluated was printed with a dry type offset printing ink (product of T&K TOKA Company, SUPERTECH MAGENTA) with a transfer amount of 1.5 g/m² using a printing suitability tester (product of Ishikawajima Industrial Machines, Model RI-2). The resulting printed matter was cut into a 10 cm×10 cm piece and as shown in FIG. 2 was allowed to stand on a flat table 2 for a day. The curl height of the printed matter 1, as shown in FIG. 2, was the average of the height at each of the four corners of the printed matter.

(4) Generation of Surface Waving

The multi-layered stretched resin film to be evaluated was subjected to 1,000-sheet continuous printing with a four-color offset printing machine (product of Mitsubishi Heavy Industries, Ltd., Model OF-4) using four colors of dry type offset printing inks (product of T&K TOKA Company, SUPERTECH Black, Cyan, Magenta and Yellow) with a transfer amount of 1.5 g/m² for each color. The resulting printed matter was allowed to stand while stacked in a columnar fashion. After the inks dried, the waving of the film was judged by sensory evaluation. Evaluation criteria are as follows:

○: no waving;
Δ: waving recognizable; and
×: serious waving.

(5) Ink Drying Property

The multi-layered stretched resin film to be evaluated was subjected to 1,000-sheet continuous printing with a four-color offset printing machine (product of Mitsubishi Heavy Industries, Ltd., Model OF-4) using four colors of dry type offset printing inks (product of T&K TOKA Company, SUPERTECH Black, Cyan, Magenta and Yellow) with a transfer amount of 1.5 g/m² for each color. The resulting printed matter was allowed to stand while stacked in a columnar fashion, and sampled at predetermined time intervals to determine the state of dryness of the ink. Evaluation criteria for the ink drying property are as follows:

5: very rapid;
4: rapid;
3: non-problematic level;
4: a little slow and problematic; and
5: very slow.

TABLE 3

| | Stretching direction of layer (A) | Constitution of layer (B) | | | | | | | Offset printing suitability |
|---|---|---|---|---|---|---|---|---|---|
| | | Amorphous resin | | | Polyolefinic resin | | Poros-ity (%) | Opacity of stretched film (%) | Curl height (mm) | after printing with practical printing |
| | | Type | Glass transition temperature (°) | Content (wt %) | Type | Content (wt %) | Stretching direction | | | | |
| Example 1 | biaxial | a | 140 | 20 | α | 80 | uniaxial | 0 | 37 | 1 | ○ |
| Example 2 | biaxial | a | 140 | 50 | α | 50 | uniaxial | 1 | 25 | 1 | ○ |
| Example 3 | biaxial | b | 125 | 20 | α | 80 | uniaxial | 0 | 45 | 0 | ○ |
| Example 4 | biaxial | b | 125 | 50 | α | 50 | uniaxial | 0 | 35 | 0 | ○ |
| Example 5 | biaxial | b | 125 | 70 | α | 30 | uniaxial | 0 | 36 | 0 | ○ |
| Example 6 | biaxial | c | 80 | 50 | α | 50 | uniaxial | 0 | 33 | 0 | ○ |
| Example 7 | biaxial | f | 105 | 50 | α | 50 | uniaxial | 0 | 34 | 0 | ○ |
| Example 8 | biaxial | a | 140 | 20 | β | 80 | uniaxial | 0 | 36 | 1 | ○ |
| Example 9 | biaxial | b | 125 | 50 | β | 50 | uniaxial | 0 | 36 | 0 | ○ |
| Example 10 | biaxial | c | 80 | 50 | β | 50 | uniaxial | 0 | 31 | 0 | ○ |
| Example 11 | biaxial | b | 125 | 50 | γ | 50 | uniaxial | 0 | 31 | 0 | ○ |
| Example 12 | biaxial | b | 125 | 50 | B γ | 25 25 | uniaxial | 0 | 33 | 0 | ○ |
| Example 13 | biaxial | d | 160 | 20 | α | 80 | uniaxial | 3 | 39 | 2 | ○ |
| Example 14 | biaxial | b | 125 | 50 | α | 50 | uniaxial | 0 | 62 | 0 | ○ |
| Example 15 | biaxial | b | 80 | 50 | α | 50 | uniaxial | 0 | 21 | 0 | ○ |
| Example 16 | uniaxial | c | 80 | 50 | α | 50 | uniaxial | 0 | 45 | 0 | ○ |
| Comparative Example 1 | biaxial | — | — | — | — | — | uniaxial | 5 | 43 | 34 | X |

TABLE 4

| | Example of multi-layered stretched resin film | Constitution of layer (B) | | | | | | | Offset printing suitability | |
|---|---|---|---|---|---|---|---|---|---|---|
| | | Amorphous resin | | | Polyolefinic resin | | Poros-ity (%) | Opacity of stretched film (%) | Curl height (mm) | after printing with practical printing | Ink drying property |
| | | Type | Glass transition temperature (°) | Content (wt %) | Type | Content (wt %) | Stretching direction | | | | | |
| Example 17 | 4 | b | 125 | 50 | α | 50 | uniaxial | 0 | 48 | 0 | ○ | 5 |
| Example 18 | 6 | c | 80 | 50 | α | 50 | uniaxial | 0 | 48 | 0 | ○ | 5 |
| Example 19 | 9 | b | 125 | 50 | β | 50 | uniaxial | 0 | 48 | 0 | ○ | 5 |
| Example 20 | 14 | b | 125 | 50 | α | 50 | uniaxial | 0 | 69 | 0 | ○ | 5 |
| Example 21 | 15 | b | 125 | 50 | α | 50 | uniaxial | 0 | 40 | 0 | ○ | 5 |
| Example 22 | 16 | c | 80 | 50 | α | 50 | uniaxial | 0 | 55 | 0 | ○ | 5 |

Examples 23 and 26 to 42

A composition (A) was prepared by mixing 87 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 5 wt % of calcium carbonate having an average grain size of 1.5 μm. The composition (A) was kneaded in an extruder set at 270° C., extruded from a die in sheet form, and then cooled using a cooling apparatus to thereby produce an unstretched sheet. The sheet was re-heated up to 155° C. and stretched 5-fold in the longitudinal direction by means of the difference in the peripheral speeds of a number of roller groups.

A composition (B) was separately prepared by mixing an amorphous resin with a polyolefinic resin, both listed in Table 5, in amounts listed in Table 5. The composition (C.) was prepared by mixing an inorganic fine powder and a propylene homopolymer having a melt flow rate (MFR) of 4.0 g/10 minutes (peak melting temperature=160° C., melting completion temperature=167° C.), both listed in Table 5, in amounts listed in Table 5. The compositions (B) and (C.) were separately kneaded in individual extruders set at 270° C., stacked in a single die and then co-extruded therefrom. The resulting sheet was then laminated on one surface of the above-described 5-fold stretched sheet (A), thereby providing a layer structure of (C)/(B)/(A). The resulting sheet was then also laminated on the opposite surface of the sheet (A), thereby providing a five-layered laminate having a layer structure of (C)/(B)/(A)/(B)/(C).

The five-layered laminate was heated to 175° C., stretched 7.5-fold in the transverse direction using a tenter to provide a five-layered film. The surface of this five-layered film was subjected to corona discharge treatment, thereby providing a five-layered stretched resin film having a structure expressed as (C)/(B)/(A)/(B)/(C) (4 μm/15 μm/72 μm/15 μm/4 μm thick, respectively).

This process was repeated with different amounts and types of amorphous resins and polyolefinic resins to provide different amorphous resin-containing layers (B), and different inorganic fine powders for the surface layer (C), as shown in Table 5. Thus, 18 different multi-layered stretched resin films were prepared as described in Examples 23 and 26 to 42.

Example 24

A five-layered stretched resin film was prepared as described in Example 23, except that the composition (A) was prepared by mixing 90 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 2 wt % of calcium carbonate having an average grain size of 1.5 μm. The compositions (B) and (C) were prepared using the materials listed in Table 5 in amounts listed in Table 5.

Example 25

A five-layered stretched resin film was obtained as described in Example 23, except that the composition (A) was prepared by mixing 84 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 8 wt % of calcium carbonate having an average grain size of 1.5 μm. The compositions (B) and (C) were prepared using materials listed in Table 5 in amounts again listed in Table 5.

Example 43

A composition (A) was prepared by mixing 90 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 2 wt % of calcium carbonate having an average grain size of 1.5 μm. The composition (A) was kneaded in an extruder set at 270° C., extruded from a die in sheet form, and then cooled using a cooling apparatus, thereby providing an unstretched sheet. The sheet was re-heated up to 155° C. and stretched 5-fold in the longitudinal direction by means of the difference in the peripheral speeds of a number of roller groups.

A composition (B) was separately prepared by mixing an amorphous resin with a polyolefinic resin, both listed in Table 5, in amounts listed in Table 5. The composition (C) was prepared by mixing an inorganic fine powder and a propylene homopolymer having a melt flow rate (MFR) of 4.0 g/10 minutes (peak melting temperature=160° C., melting completion temperature=167° C.), both listed in Table 5, in amounts listed in Table 5. The composition (D) was prepared by mixing 70 wt % of a propylene homopolymer having a melt flow rate (MFR) of 4.0 g/10 minutes (peak melting temperature=160° C., melting completion temperature=167° C.) and 30 wt % of calcium carbonate having an average grain size of 1.5 μm. The compositions (B), (C) and (D) were separately kneaded in individual extruders set at 270° C., stacked in a single die and then co-extruded therefrom, and the resulting sheet was then laminated on one surface of the above-described 5-fold stretched sheet (A) so as to provide a layer structure of (C)/(B)/(D)/(A). The sheet was also laminated on the opposite surface of the stretched sheet (A) to thereby finally provide a seven-layered laminate having a layer structure of (C)/(B)/(D)/(A)/(D)/(B)/(C).

The seven-layered laminate was heated to 175° C., stretched 7.5-fold in the transverse direction using a tenter to thereby obtain a seven-layered film. The surface of this seven-layered film was subjected to corona discharge treatment, thereby providing a seven-layered stretched resin film having a structure expressed as (C)/(B)/(D)/(A)/(D)/(B)/(C) (4 μm/15 μm/15 μm/62 μm/15 μm/15 μm/4 μm thick, respectively).

Comparative Example 2

A seven-layered stretched resin film was obtained as described in Example 43, except that the composition (B) was prepared by mixing 55 wt % of a propylene homopolymer having a melt flow rate (MFR) of 5.0 g/10 minutes (peak melting temperature=160° C., melting completion temperature=167° C.) and 45 wt % of calcium carbonate having an average grain size of 1.5 μm, the composition (C) was prepared by adding an inorganic fine powder listed in Table 5 in an amount listed in Table 5 to a propylene homopolymer having a melt flow rate (MFR) of 4.0 g/10 minutes (peak melting temperature=160° C., melting completion temperature=167° C.).

Example 44

A composition (A) was prepared by mixing 88 wt % of a propylene homopolymer having a melt flow rate (MFR) of 0.8 g/10 minutes (peak melting temperature=160° C., melting completion temperature=167° C.) and 10 wt % of a high-density polyethylene, and by further adding thereto 2 wt % of calcium carbonate having an average grain size of 1.5 μm. A composition (B) was separately prepared by mixing an amorphous resin with a polyolefinic resin, both listed in Table 5, in an amount listed in Table 5. The composition (C) was prepared by adding an inorganic fine powder listed in Table 5 in an amount listed in Table 5 to a propylene homopolymer having a melt flow rate (MFR) of 4.0 g/10 minutes (peak melting temperature=160° C., melting completion temperature=167° C.). The compositions (A), (B) and (C) were separately kneaded in individual extruders set at 270° C., stacked in a single die to provide a stack structure of (C)/(B)/(A)/(B)/(C), co-extruded therefrom, and then cooled using a cooling apparatus, thereby providing an unstretched sheet. The sheet was then heated to 155° C., and stretched 5-fold in the longitudinal direction by means of the difference in the peripheral speeds of a number of roller groups. The resultant five-layered stack was then heated to 175° C., and stretched 7.5-fold in the transverse direction using a tenter to thereby obtain a five-layered film. The surface of this five-layered film was subjected to corona discharge treatment, thereby providing a five-layered stretched resin film having a structure expressed as (C)/(B)/(A)/(B)/(C) (5 μm/5 μm/40 μm/5 μm/5 μm thick, respectively).

Example 45

A composition (A) was prepared by mixing 87 wt % of a propylene homopolymer having a melt flow rate (MFR) of 0.8 g/10 minutes (peak melting temperature=160° C., melting completion temperature=167° C.) and 8 wt % of a high-density polyethylene, and by further adding thereto 5 wt % of calcium carbonate having an average grain size of 1.5 μm. A composition (B) was separately prepared by mixing an amorphous resin with a polyolefinic resin, both listed in Table 5, in amounts listed in Table 5. The composition (C) was prepared by adding an inorganic fine powder listed in Table 5 in an amount listed in Table 5 to a propylene homopolymer having a melt flow rate (MFR) of 4.0 g/10 minutes (peak melting temperature=160° C., melting completion temperature=167° C.). The compositions (A), (B) and (C) were separately kneaded in individual extruders set at 270° C., co-extruded in sheet form from a single die so as to provide a layer structure of (C)/(B)/(A)/(B)/(C), and then cooled using a cooling apparatus, thereby providing an unstretched sheet. The sheet was then heated to 155° C., stretched 5-fold in the longitudinal direction by means of the difference in the peripheral speeds of a number of roller groups. The surface of such five-layered film was subjected to corona discharge treatment, thereby providing a five-layered stretched resin film having a constitution expressed as (C)/(B)/(A)/(B)/(C) (15 μm/15 μm/70 μm/15 μm/15 μm thick, respectively).

Test Example 2

The porosity and opacity, and the offset printing suitability (curl height, waving after printing with a commercial printing machine, and ink drying property) of the multi-layered stretched resin films described in Examples 23 to 45 and Comparative Example 2 were were evaluated according to the procedures described above in Test Example 1. The smoothness of the surface layer (C) was measured in compliance with JIS P-8119, herein incorporated by reference. The results are shown in Table 5.

TABLE 5

| | | Constitution of layer (B) | | | | | |
| | | Amorphous resin | | Polyolefinic resin | | | Porosity of layer (B) (%) |
| | Stretching direction of layer (A) | Type | transition temperature (°) | Content (wt %) | Type | Content (wt %) | Stretching direction | |
|---|---|---|---|---|---|---|---|---|
| Example 23 | biaxial | a | 140 | 50 | α | 50 | uniaxial | 1 |
| Example 24 | biaxial | e | 105 | 20 | α | 80 | uniaxial | 0 |
| Example 25 | biaxial | e | 105 | 70 | α | 30 | uniaxial | 0 |
| Example 26 | biaxial | b | 125 | 50 | α | 50 | uniaxial | 0 |
| Example 27 | biaxial | c | 80 | 50 | α | 50 | uniaxial | 0 |
| Example 28 | biaxial | f | 105 | 50 | α | 50 | uniaxial | 0 |
| Example 29 | biaxial | g | 100 | 50 | α | 50 | uniaxial | 0 |
| Example 30 | biaxial | d | 160 | 20 | α | 80 | uniaxial | 3 |
| Example 31 | biaxial | c | 105 | 50 | α | 50 | uniaxial | 0 |
| Example 32 | biaxial | e | 105 | 50 | α | 50 | uniaxial | 0 |
| Example 33 | biaxial | e | 105 | 50 | α | 50 | uniaxial | 0 |
| Example 34 | biaxial | e | 105 | 50 | α | 50 | uniaxial | 0 |
| Example 35 | biaxial | e | 105 | 50 | α | 50 | uniaxial | 0 |
| Example 36 | biaxial | e | 105 | 50 | α | 50 | uniaxial | 0 |
| Example 37 | biaxial | e | 105 | 50 | α | 50 | uniaxial | 0 |
| Example 38 | biaxial | e | 105 | 50 | α | 50 | uniaxial | 0 |
| Example 39 | biaxial | e | 105 | 50 | α | 50 | uniaxial | 0 |
| Example 40 | biaxial | e | 105 | 50 | β | 50 | uniaxial | 0 |
| Example 41 | biaxial | c | 80 | 50 | β | 50 | uniaxial | 0 |
| Example 42 | biaxial | e | 105 | 50 | β | 25 | uniaxial | 0 |
| | | | | | γ | 25 | | |
| Example 43 | biaxial | e | 105 | 50 | α | 50 | uniaxial | 0 |
| Example 44 | biaxial | e | 105 | 50 | α | 50 | biaxial | 0 |
| Example 45 | uniaxial | c | 80 | 50 | α | 50 | uniaxial | 0 |
| Comparative Example 2 | biaxial | — | — | — | — | — | uniaxial | 30 |

TABLE 5-continued

| | Constitution of layer (C) | | | Opacity | | Offset printing suitability | |
|---|---|---|---|---|---|---|---|
| | Inorganic fine powder | | Smoothness (sec) | Presence of layer (D) | of stretched film (%) | Curl height (mm) | after printing with practical printing | Ink drying property |
| | Type | Content (wt %) | | | | | | |
| Example 23 | A | 55 | 10,000 | no | 47 | 2 | ○ | 5 |
| Example 24 | A | 55 | 10,000 | no | 37 | 0 | ○ | 5 |
| Example 25 | A | 55 | 10,000 | no | 53 | 0 | ○ | 5 |
| Example 26 | A | 55 | 10,000 | no | 45 | 0 | ○ | 5 |
| Example 27 | A | 55 | 10,000 | no | 46 | 0 | ○ | 5 |
| Example 28 | A | 55 | 10,000 | no | 43 | 0 | ○ | 5 |
| Example 29 | A | 55 | 10,000 | no | 44 | 0 | ○ | 5 |
| Example 30 | A | 55 | 10,000 | no | 49 | 4 | ○ | 5 |
| Example 31 | A | 35 | 4,000 | no | 39 | 0 | ○ | 4 |
| Example 32 | A | 45 | 7,000 | no | 41 | 0 | ○ | 5 |
| Example 33 | A | 55 | 10,000 | no | 43 | 0 | ○ | 5 |
| Example 34 | A | 65 | 13,000 | no | 45 | 0 | ○ | 5 |
| Example 35 | B | 55 | 8,000 | no | 43 | 0 | ○ | 5 |
| Example 36 | C | 45 | 5,000 | no | 41 | 0 | ○ | 5 |
| Example 37 | D | 55 | 2,000 | no | 41 | 0 | ○ | 5 |
| Example 38 | E | 55 | 1,000 | no | 42 | 0 | ○ | 5 |
| Example 39 | F | 55 | 1,000 | no | 42 | 0 | ○ | 5 |
| Example 40 | A | 55 | 10,000 | no | 45 | 1 | ○ | 5 |
| Example 41 | A | 55 | 10,000 | no | 45 | 1 | ○ | 5 |
| Example 42 | A | 55 | 10,000 | no | 45 | 1 | ○ | 5 |
| Example 43 | A | 55 | 10,000 | yes | 61 | 0 | ○ | 5 |
| Example 44 | A | 55 | 10,000 | no | 27 | 0 | ○ | 5 |
| Example 45 | A | 55 | 10,000 | no | 51 | 0 | ○ | 5 |
| Comparative Example 2 | E | 3 | 4,000 | yes | 69 | 33 | X | 2 |

INDUSTRIAL APPLICABILITY

The multi-layered stretched resin film of the present invention is resistant to waving or curling due to contact with the vehicle of offset printing ink during offset printing. This ensures that the multi-layered stretched resin films of the present invention have excellent printing properties. The multi-layered stretched resin film having a surface layer (C) of the present invention also has excellent ink drying properties. The multi-layered stretched resin film is particularly suitable for use as a material for tracing paper, maps, book covers, wrapping paper, book paper, sticker sheets, poster paper, menu sheets, hanging screens, labels, shopping bags, cardboard, brochures, illuminated sign boards, and so forth.

The priority document of the present application, Japanese application 11/221127, filed Aug. 4, 1999, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A multi-layered stretched resin film comprising:
   a base layer (A) comprising more than 90 wt % of a first polyolefinic resin and less than 10 wt % of a first inorganic fine powder and/or a first organic filler; and
   an amorphous resin-containing layer (B) comprising 0 to 85 wt % of a second polyolefinic resin and 15 to 100 wt % of an amorphous resin,
   wherein the amorphous resin-containing layer (B) is disposed on at least one surface of the base layer (A), the amorphous resin-containing layer (B) has a porosity of 5% or less, and the amorphous resin has a glass transition temperature of 70 to 170° C.

2. The multi-layered stretched resin film of claim 1, wherein said first polyolefinic resin is a propylene homopolymer having a melting point of 155 to 174° C., a melt flow rate of 0.5 to 10 g/10 minutes, and a crystallinity of 45 to 70%.

3. The multi-layered stretched resin film of claim 1, wherein said base layer (A) has a thickness of 20 to 250 μm.

4. The multi-layered stretched resin film of claim 1, wherein said amorphous resin is a cycloolefinic resin.

5. The multi-layered stretched resin film of claim 1, wherein said second polyolefinic resin is selected from the group consisting of homopolymers of propylene, copolymers of propylene, homopolymers of ethylene, copolymers of ethylene, and mixtures thereof.

6. The multi-layered stretched resin film of claim 1, wherein the amorphous resin-containing layer (B) has a thickness of 1 to 100 μm.

7. The multi-layered stretched resin film of claim 1, further comprising a surface layer (C) comprising 30 to 85 wt % of a third polyolefinic resin and 15 to 70 wt % of a second inorganic fine powder and/or a second organic filler,
   wherein said surface layer (C) is disposed on at least one surface of said multilayered stretched resin film comprising said base layer (A) and said amorphous resin-containing layer (B).

8. The multi-layered stretched resin film of claim 7, wherein said surface layer (C) has a thickness of 1 to 100 μm.

9. The multi-layered stretched resin film of claim 7, wherein the second inorganic fine powder has a grain size in the range of 0.01 to 6 μm, or the second organic filler has a average dispersion grain size, in the range of 0.01 to 6 μm.

10. The multi-layered stretched resin film of claim 7, wherein the surface layer (C) comprises a third polyolefinic resin and a second inorganic fine powder, and the second inorganic fine powder comprises calcium carbonate.

11. The multi-layered stretched resin film of claim 10, wherein the second inorganic fine powder comprises surface-modified calcium carbonate.

12. The multi-layered stretched resin film of claim 7, wherein said surface layer (C) has a smoothness of 20,000 seconds or less, determined in compliance with JIS P-8119.

13. The multi-layered stretched resin film of claim 7, wherein the multi-layered stretched resin film has a structure selected from the group consisting of (C)/(B)/(A)/(B)/(C), (C)/(B)/(A)/(B), (C)/(B)/(A)/(C) and (C)/(B)/(A).

14. The multi-layered stretched resin film of claim 7, further comprising an intermediate layer (D) comprising a polypropylene homopolymer or copolymer and 2 to 55 wt % of a fourth inorganic fine powder, wherein said intermediate layer (D) is disposed between said base layer (A) and said amorphous resin-containing layer (B).

15. The multi-layered stretched resin film of claim 7, further comprising an intermediate layer (D) comprising a polypropylene homopolymer or copolymer and 2 to 55 wt % of a fourth inorganic fine powder, wherein said intermediate layer (D) is disposed between said base layer (A) and said surface layer (C).

16. The multi-layered stretched resin film of claim 1, wherein the total thickness of the multi-layered stretched resin film is 30 to 450 µm.

17. The multi-layered stretched resin film of claim 1, wherein the opacity of the multi-layered stretched resin film is less than 70%, determined in compliance with JIS P-8138.

18. The multi-layered stretched resin film of claim 1, further comprising a pigment coated layer on at least one outermost surface of the multi-layered stretched resin film.

19. A printed multi-layered stretched resin sheet comprising the multi-layered stretched resin sheet according to claim 1 printed with an offset printing ink.

20. A method of preparing the multi-layered stretched resin film of claim 1, comprising:

kneading a resin composition for the base layer (A) comprising more than 90 wt % of a first polyolefinic resin and less than 10 wt % of a first inorganic fine powder and/or first organic filler;

kneading a resin composition for the amorphous resin-containing layer (B) comprising 0 to 85 wt % of a second polyolefinic resin and 15 to 100 wt % of an amorphous resin;

forming the kneaded resin composition for the base layer (A) into a base layer sheet;

longitudinally stretching the base layer sheet;

forming the kneaded resin composition for the amorphous resin-containing layer (B) into an amorphous resin-containing layer sheet;

laminating the amorphous resin-containing sheet to at least one surface of the base layer sheet to form a laminated sheet; and transversely stretching the laminated sheet.

21. The method of claim 20, further comprising:

kneading a resin composition for a surface layer (C) comprising 30 to 85 wt % of a third polyolefinic resin and 15 to 70 wt % of a second inorganic fine powder and/or a second organic filler;

forming the kneaded resin composition for a surface layer (C) into a surface layer sheet disposed on the surface of the amorphous resin-containing layer sheet;

wherein after said laminating, the surface layer sheet is disposed toward the base layer sheet and the amorphous resin-containing sheet is disposed away from the base layer sheet.

* * * * *